(No Model.)
M. CHOQUETTE.
BICYCLE TIRE ARMOR.
No. 589,163. Patented Aug. 31, 1897.
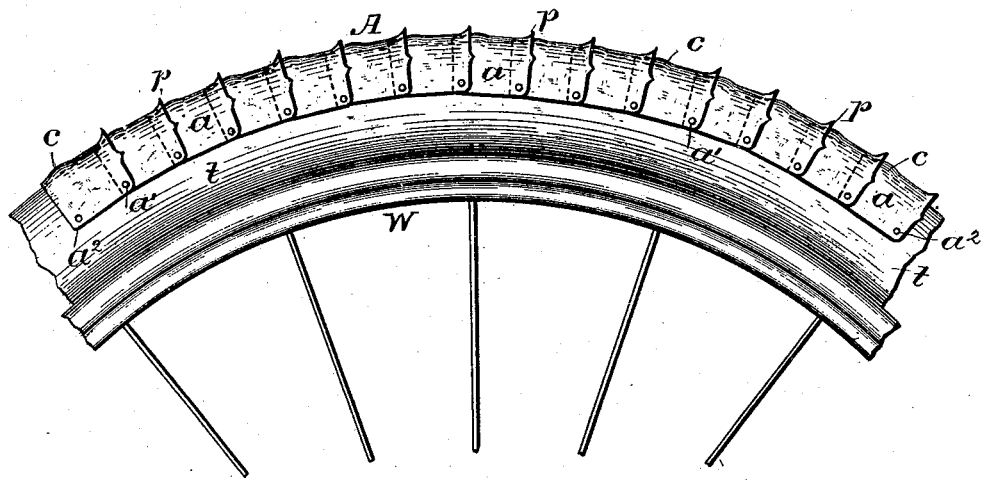
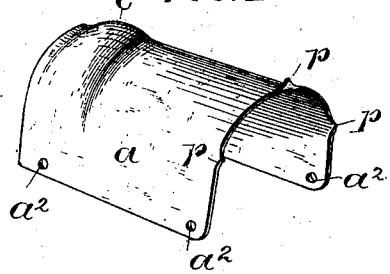
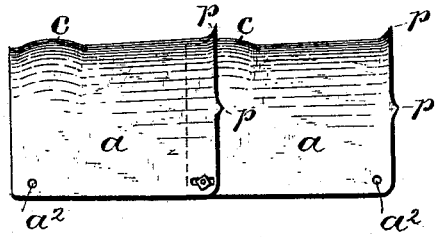
ATTEST.
J. Henry Kaiser
W. C. Lawson
INVENTOR.
Michelle Choquette.
By A. C. MacNulty
his Atty.

UNITED STATES PATENT OFFICE.

MICHELLE CHOQUETTE, OF KANKAKEE, ILLINOIS.

BICYCLE-TIRE ARMOR.

SPECIFICATION forming part of Letters Patent No. 589,163, dated August 31, 1897.

Application filed December 19, 1896. Serial No. 616,242. (No model.)

*To all whom it may concern:*

Be it known that I, MICHELLE CHOQUETTE, a citizen of the United States, residing at Kankakee, in the county of Kankakee and State of Illinois, have invented certain new and useful Improvements in Bicycle-Tire Armors; and I do hereby declare the following to be a full, clear, and exact description of the invention, such as will enable others skilled in the art to which it appertains to make and use the same.

My invention relates to improvements in armor for bicycle-tires; and it consists of the novel and peculiar construction and combination of the parts, substantially as hereinafter set forth, and specifically pointed out in the claim.

The primary object of my invention is to provide a metallic armor for pneumatic bicycle-tires susceptible of ready adjustment to such tires and adapted to obviate punctures and other damage thereto.

Of the drawings forming a part of this specification, Figure 1 is a side elevation of a portion of a bicycle-wheel provided with a pneumatic tire and protected by my improved tire-armor. Fig. 2 is a perspective view of one of the flexible plates, an essential feature of my device. Fig. 3 is a perspective view of the end plates of my device, showing the set-screws, by means of which the ends of my protective belt are preferably joined together.

In the drawings, in which similar letters of reference indicate corresponding parts, W is a bicycle-wheel of the usual well-known form, which is provided with the pneumatic tire $t$.

A is my improved tire-armor, composed of flexible metallic plates, which plates are joined together by means of the rivets $a'$ and are so connected that the projecting rear edge of each plate overlaps and moves freely over the lateral corrugation $c$ of the preceding plate, the whole forming a flexible belt or band susceptible of being readily attached to and detached from the periphery of the tire $t$. The plates $a$ are also so curved as to fit snugly and closely about the tire $t$, and are also provided with appropriately-located apertures $a^2$, through which pass the rivets or studs $a'$, the end plates being connected together by means of set-screws, hooks, or other convenient mode of fastening.

When attached to the wheel of a vehicle provided with a pneumatic tire, it is apparent that my device will bind tightly about the exposed portions of said tire and effectually prevent same from being punctured or otherwise damaged. By reason of the simplicity in the means of fastening the end plates together it is further obvious that my device may be readily attached to and detached from the wheel, while by the provision of the lips or projections $p$ it is plain that the tendency of the wheel to slip and slide, especially in turning corners, will be practically obviated.

Having described my invention and its operation, what I claim is—

In a pneumatic-tire armor, the combination of a series of overlapping, flexible, metallic plates, adapted to snugly fit about the exposed portions of a pneumatic tire, the posterior edges of said plates being scalloped and bent downward forming lips or projections; the front portions of said metallic plates being provided with a lateral corrugation adapted to facilitate the movements of the plates upon each other, and means for joining said plates together in the form of a flexible band, substantially as described.

In testimony whereof I affix my signature in the presence of two witnesses.

MICHELLE CHOQUETTE.

Witnesses:
W. H. JANARY,
H. F. RICE.